UNITED STATES PATENT OFFICE.

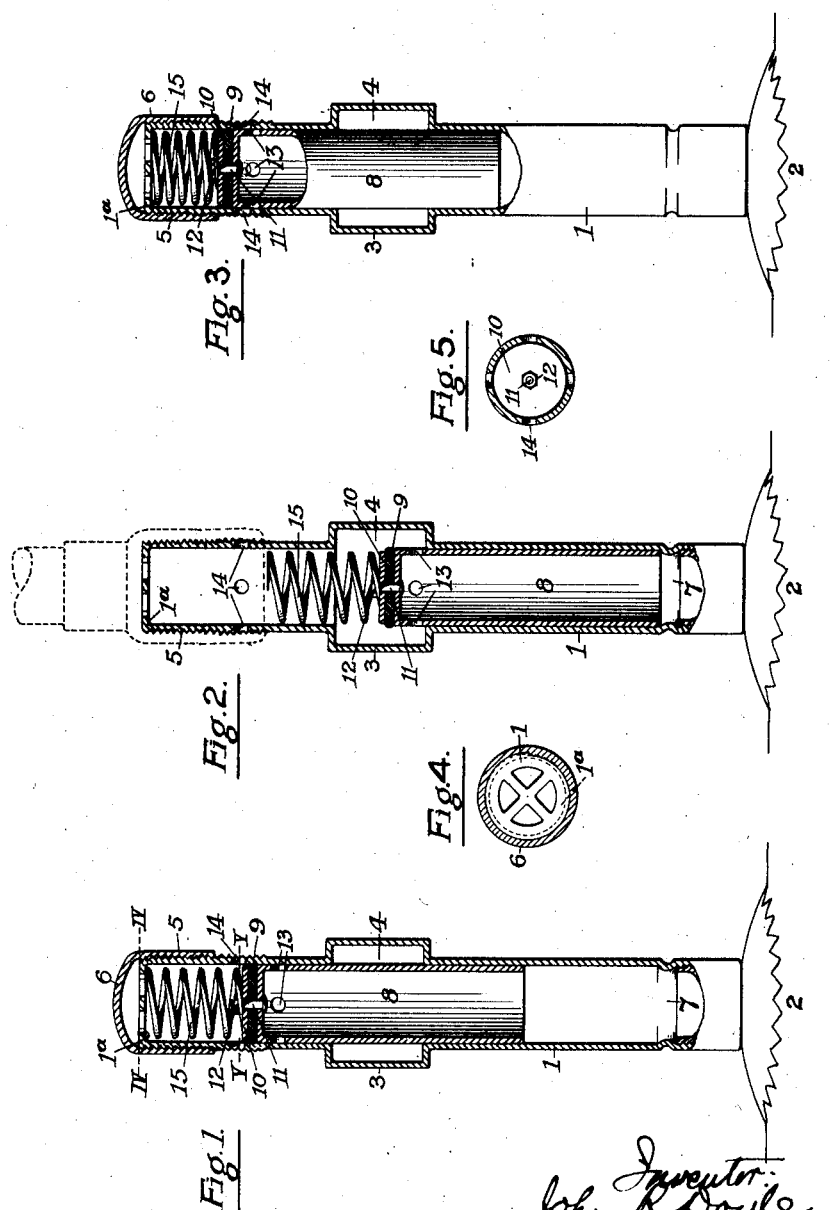

JOHN R. DOYLE, OF PHILADELPHIA, PENNSYLVANIA.

VALVE.

1,338,562.  Specification of Letters Patent.  Patented Apr. 27, 1920.

Application filed March 25, 1918. Serial No. 224,557.

*To all whom it may concern:*

Be it known that I, JOHN R. DOYLE, a citizen of the United States, residing in Philadelphia, Pennsylvania, have invented certain Improvements in Valves, of which the following is a specification.

My invention relates to valves for controlling fluid pressure, and comprises certain improvements in valves of this type employed in connection with the inflation of the inner tubes of pneumatic tires.

The object of my invention is to provide a valve for the purpose described which shall be double acting; that is to say, it will serve to control and hold a certain and desired fluid pressure within the tire under one condition, and under another condition to relieve excessive pressure within such tire due to any cause. In addition, the valve will be readily displaceable by the entrance of fluid under pressure so as to insure that inflation of the tire can proceed as needed.

A further object of my invention is to provide a structure extremely simple in character and mode of operation, of few parts and quite efficient in action.

These and other features of my invention are more fully described hereinafter, reference being had to the accompanying drawings, in which:

Figure 1, is a sectional elevation of a valve structure made in accordance with my invention, showing the same in the normal quiescent condition when the tire is in use.

Fig. 2, is a sectional elevation illustrating the position of the valve when the tire is being inflated.

Fig. 3, is a view illustrating the position of the valve when excess pressure within the inflatable tube is being relieved, and Figs. 4 and 5, are sectional views on the lines IV—IV and V—V, Fig. 1, respectively.

In the drawings, 1 represents a tubular member or casing for attachment in any usual or well known manner to the inflatable tube of an automobile tire, indicated at 2, and this tubular casing is provided with an enlargement 3 intermediate its ends, providing an internal chamber 4. The outer end of the casing may be threaded at 5 for the reception of the usual cap 6 to keep out dirt and dust, while at a point adjacent its attachment with the inflatable tube 2, I may provide an internal shoulder 7, for a purpose to be described.

Slidably mounted within the casing 1 and closely fitting the same, is a second tube or tubular member 8, fully open at its lower end and carrying at its upper end a compressible washer or gasket 9, engaging the inner wall of the tubular member 1, over which may lie a disk 10, held in place by a screw 11 and nut 12; such tubular member 8 serving as a piston, and the washer or gasket 9 being designed to serve as the packing therefor. This end of the tubular member 8 may be closed, and just below the closed end apertures 13 are formed in its walls. The casing 1 is also apertured at 14. The shoulder 7, formed by beading the tubular casing 1 serves to limit the inward movement of the tubular member 8.

Interposed between the piston-like inner tubular member 8 and the top of the casing 1 is a spring 15 of known compression value; such spring being predetermined to hold the valve against pressure not exceeding 80 or 90 lbs. for instance. The lower end of this spring may rest upon the plate 10 overlying the gasket 9, while the upper end engages a shoulder 1ª at the inlet end of the tubular member 1.

The operation of my improved valve is as follows: The casing 1 constituting the part which projects from the inflatable inner tube 2 through the rim of an automobile wheel may be connected to an air tube leading from a source of supply by a nipple in the usual manner, as shown by the dotted lines in Fig. 2, and upon air being forced into said casing 1, it will push down the piston member 8 to an extent sufficient to bring the gasket 9 below the upper wall of the enlarged chamber 4 of said tubular member, (see Fig. 2,) whereupon the air will pass around such gasket and through the apertures 13 and into the tubular member 8, and thence to the lower part of the casing 1 and into the inflatable tube 2. When the tire is filled to the desired extent and the connection with the air tube has been removed, the pressure of air within the tire will lift the inner tubular member 8; carrying the gasket 9 away from its position with reference to the chamber 4 of said casing 1, thereby cutting off the bypass through the apertures 13 until its upper end is stopped by the spring 15 in the upper end of the casing 1; the compression value of which has been previously determined.

Should the pressure within the tire increase from any cause, as for instance by reason of the tire heating when running on hot roads in summer, or for any other reason, such increased pressure will tend to raise the inner tubular member 8 against the tension of the spring until the apertures 13 of such inner tubular member 8 are opposite the apertures 14 of the casing 1, whereupon leakage of air from the tire will occur and the pressure within the tire will be automatically relieved until it has been reduced to a degree that will permit the spring 15 to hold the tubular member 8 with the gasket in the closed position below said apertures 14, as shown in Fig. 1.

I claim:

1. In a valve, the combination of a tubular casing having an enlargement, a hollow member having a portion closely fitting the inner wall of said casing and movable with respect thereto; said hollow member having apertures for the admission of fluid under pressure when the outer end of its closely fitting portion is brought opposite the enlargement of the casing, and a spring limiting the outward movement of the hollow member in the casing while permitting said outer end of the closely fitting portion normally to lie above the enlargement, said member being free to move outwardly under excess pressure against the tension of said spring to permit leakage through its aperture.

2. In a valve, the combination of a tubular casing having an enlarged chamber intermediate its ends, an inner tubular member closely fitting the inner wall of the casing and movable with respect thereto; said inner member having apertures whereby fluid under pressure may be passed thereto when its upper end is below the upper wall of the chambered portion of the casing; said member being normally held above the lower edge of such wall by internal pressure, and a spring limiting the outward movement of said tubular member under normal internal pressure.

3. In a valve, the combination of a tubular casing having an enlarged chamber intermediate its ends, an inner tubular member closely fitting the inner wall of the casing and movable with respect thereto; said inner member having apertures whereby fluid under pressure may pass when it occupies different positions within the casing and being normally held above the lower wall of the enlarged chamber by internal pressure, and a spring for normally holding said tubular member against movement in one direction; said spring having a predetermined tension whereby excess pressure may react upon the inner tubular member against the tension of said spring to permit the excess pressure to automatically exhaust.

4. In a valve, the combination of a tubular casing having an enlarged chamber intermediate its ends, an inner tubular member fitting the inner wall of the outer member and movable with respect thereto, a fluid tight closure between said casing and inner member; said inner member and casing having apertures; said inner member being inwardly movable whereby fluid under pressure may be passed thereto through its apertures when its upper end is below the upper wall of the chambered portion of the outer member; said member lying normally above such wall and held in such position by internal pressure, and a spring for normally holding said tubular member against outward movement; said spring having a predetermined tension whereby excess pressure within the tire may react upon the inner tubular member against such tension to permit the excess air to automatically exhaust.

5. In a valve, the combination of a tubular casing having an enlarged chamber intermediate its ends, an inner tubular member fitting the inner wall of the outer member and movable with respect thereto, a fluid tight closure between said casing and inner member; said inner member and casing having apertures; said inner member being inwardly movable whereby fluid under pressure may be passed thereto through its apertures when its upper end is below the upper wall of the chambered portion of the outer member; said member lying normally above such wall and held in such position by internal pressure, a spring for normally holding said tubular member against outward movement; said spring having a predetermined tension whereby excess pressure within the tire may react upon the inner tubular member against such tension to permit the excess air to automatically exhaust, and means carried by the casing for limiting the inward movement of the inner tubular member.

JOHN R. DOYLE.